United States Patent [19]

Stimpfl

[11] Patent Number: 5,349,713
[45] Date of Patent: Sep. 27, 1994

[54] MAGNETIC TAPE CLEANING SYSTEM

[75] Inventor: Jerome P. Stimpfl, 2545 Vine Pl., Boulder, Colo. 80304

[73] Assignee: Jerome P. Stimpfl, Boulder, Colo.

[21] Appl. No.: 981,713

[22] Filed: Nov. 25, 1992

[51] Int. Cl.$^5$ .............................................. G11B 3/58
[52] U.S. Cl. ................................... 15/1.51; 15/308; 15/309.1; 15/DIG.13; 360/137
[58] Field of Search .................. 15/308, 309.1, 1.51, 15/97.1, 307, 306.1, 100, DIG. 13; 360/137, 128

[56] References Cited

U.S. PATENT DOCUMENTS

| | | | |
|---|---|---|---|
| 3,475,782 | 11/1969 | Teuber | 15/308 |
| 3,701,178 | 10/1972 | Kuntz | 15/308 |
| 4,185,306 | 1/1980 | Dudley | 360/71 |
| 4,198,601 | 4/1980 | Dunn | 15/1.51 |
| 4,408,243 | 10/1983 | Bonner et al. | 360/137 |
| 4,454,621 | 6/1984 | Testone | 15/1.51 |
| 4,713,857 | 12/1987 | Cecil et al. | 15/97.1 |
| 4,930,033 | 5/1990 | Pergerson | 360/137 |
| 5,144,513 | 9/1992 | Gadsby et al. | 15/DIG. 13 |

*Primary Examiner*—Timothy F. Simone
*Assistant Examiner*—Reginald L. Alexander
*Attorney, Agent, or Firm*—Francis A. Sirr

[57] ABSTRACT

A cleaning system for magnetic tape intended for high density magnetic data usage combines passing a high volume flow of negatively ionized air across a moving tape surface with simultaneous wiping of one surface of the tape with a soft, non-abrading material to remove dust and foreign particles from the tape. The air flow passes through a filter, which removes the particles. The air then passes through an ionizing grid and back across the tape in a continuous, closed loop operation. The cleaning material is housed in a removable cartridge along with the air filter. A brush moves in response to loading of the tape to pinch the tape and thus remove particles from the surface opposite the tape surface engaged by the soft material.

14 Claims, 5 Drawing Sheets

MAGNETIC TAPE CLEANING SYSTEM

BACKGROUND OF THE INVENTION

1. Field of the Invention

This invention relates to apparatus and methods for cleaning magnetic data storage tapes. The present invention is particularly useful for removing minuscule particles from the surface of magnetic tape employed in extremely high data density applications.

2. Description of the Prior Art

The sensitivity to debris, or contaminants, of magnetic tape drives that read and write digital data on magnetic tape is a function of the density of the data on the tape, and the size of the contaminating particles. Early systems with relatively low data packing densities were fairly tolerant of dust sized particles. Such particles, when ionized, tend to be attracted to the surface of the magnetic tape. However, they were not a serious impediment to data transfers by early read/write heads. Since, at most, one bit of data was normally lost, recovery was possible by error correction without reversing the drive and/or by re-reading the tape sections where data was not properly sensed. In higher density systems, loss of several bits of data may defy reconstruction and, at the very least, demand stopping, repositioning and re-reading of the tape. This procedure increases the overall data throughput time of the system.

In high density storage tapes, even a small amount of foreign matter can significantly reduce the number of tracks available for recording on the tape. Worse yet, such particles cause random losses of data in reading, thereby increasing data processing throughput time as well as hazarding lost data. In addition, particles from the tape can cause wear to the tape reader heads, and reduce the life of the machine.

Because of the manufacturing techniques used by tape manufacturers, new manufactured tapes contain a significant amount of particulate debris. For example, the screws used to hold the cassettes together are added after the tape is in place, abrading off particles of metal and plastic. Also, stored or archived tapes tend to collect dirt and dust. The dust falls off into the machine, eventually damaging it, and sticking to other tapes loaded into the machine later.

Prior art tape cleaning mechanisms include U.S. Pat. No. 4,930,033 by Pergerson, which teaches running the tape over a scrapper and through two wiper stations. In addition, U.S. Pat. Nod. 4,408,203 by Bonner et al., 4,185,306 by Dudley, and 4,713,857 by Cecile et al are all variations on bringing a wiping medium into contact with the moving tape.

These prior art tape cleaning devices suffer from a variety of disadvantages. There is no air flow to pull the particles away as they are wiped off. In addition, they fail to deionize the particles so they will not cling to the tape after they are dislodged by the wiping action. The particles may stick to the tape after wiping, or be attracted right back to the surface of the tape. Also, the particles may fall into the machine, causing wear and eventually damaging its working parts, and sticking to other tapes placed in the machine. U.S. Pat. No. 4,454,621 by Testone discloses removing charged particles from a web of textile material by discharging the web with an ionized air flow from ion generators that surround the web. The intent is to remove the particles by the air flow. This patent is not directed at the field of cleaning high density magnetic data tapes, nor does it combine wiping of the surface with an ionized air flow. The air flow is not filtered or recirculated.

No prior art device has functioned satisfactorily to remove minute particles from the surface of magnetic tape designed to handle high density digital data packing.

SUMMARY OF THE INVENTION

An object of the present invention is to clean high density magnetic recording tape by removing contaminants, such as dust, particulates and charged particles. In order to accomplish this object, a replaceable cleaning element is provided which provides a fresh cleaning media surface to each new tape inserted into the device. The tape surface is moved across the media surface as the tape is fast forwarded and rewound. Ionized air is passed across both surfaces of the tape to deionize, and enhance removal of particles on the tape. The ionized air is continuously filtered to remove the particles. Thus, the invention is able to maintain a clean environment. The cleaning effectiveness is demonstrated by a reduction in the soft error rates of a data tape, by improved quality of video recordings, or the like. The cleaning process does not diminish the quality of the tape, or deteriorate recorded information.

In accordance with this invention, apparatus and methods are provided to clean an elongated magnetic tape media which is intended for use in extremely high data density applications. This is accomplished by moving the tape media along a predetermined path, engaging the surface of the tape media with a wiping media at a first location, driving air through a flow path including the first location so that the air passes over the surface of the tape media, and ionizing the air in the flow path prior to passage over the tape media surface.

As a feature of the present invention, the wiping media is a soft, felt-like material which contacts the front surface of the tape. The air is negatively ionized. As a further feature, the wiping media includes a brush which contacts the surface of the tape opposite the surface engaged by the felt-like material. Further, the wiping media is periodically and incrementally moved to provide a fresh surface for engaging the tape.

As yet another feature, the present invention filters the air passing through the flow path. The flow path is a closed loop so that the air is recirculated. The preferred embodiment of the present invention ionizes the air in the flow path by utilizing an electrostatic discharge grid in the flow path, and applying a potential voltage across the grid.

The present invention further can include a replaceable cleaning cartridge which wipes the tape with a wiping media, and moves the wiping media so that a new surface is exposed each time a new tape is inserted into the invention. In one embodiment, the cleaning cartridge includes a supply reel, a take up reel and a ratchet to move the wiping media from the supply reel to the take up reel. The cartridge can further incorporate a filter to filter the ionized air.

The present invention provides a tape cleaning system which removes particles from high density magnetic data tape media by the combined action of ionized air flow and wiping the tape, and continually filters the particles out of the air.

Those having normal skill in the art will recognize the foregoing and other objects, features, advantages and applications of the present invention from the following more detailed description of the preferred embodiments as illustrated in the accompanying drawings.

DETAILED DESCRIPTION OF THE PREFERRED EMBODIMENTS

Figure 1:
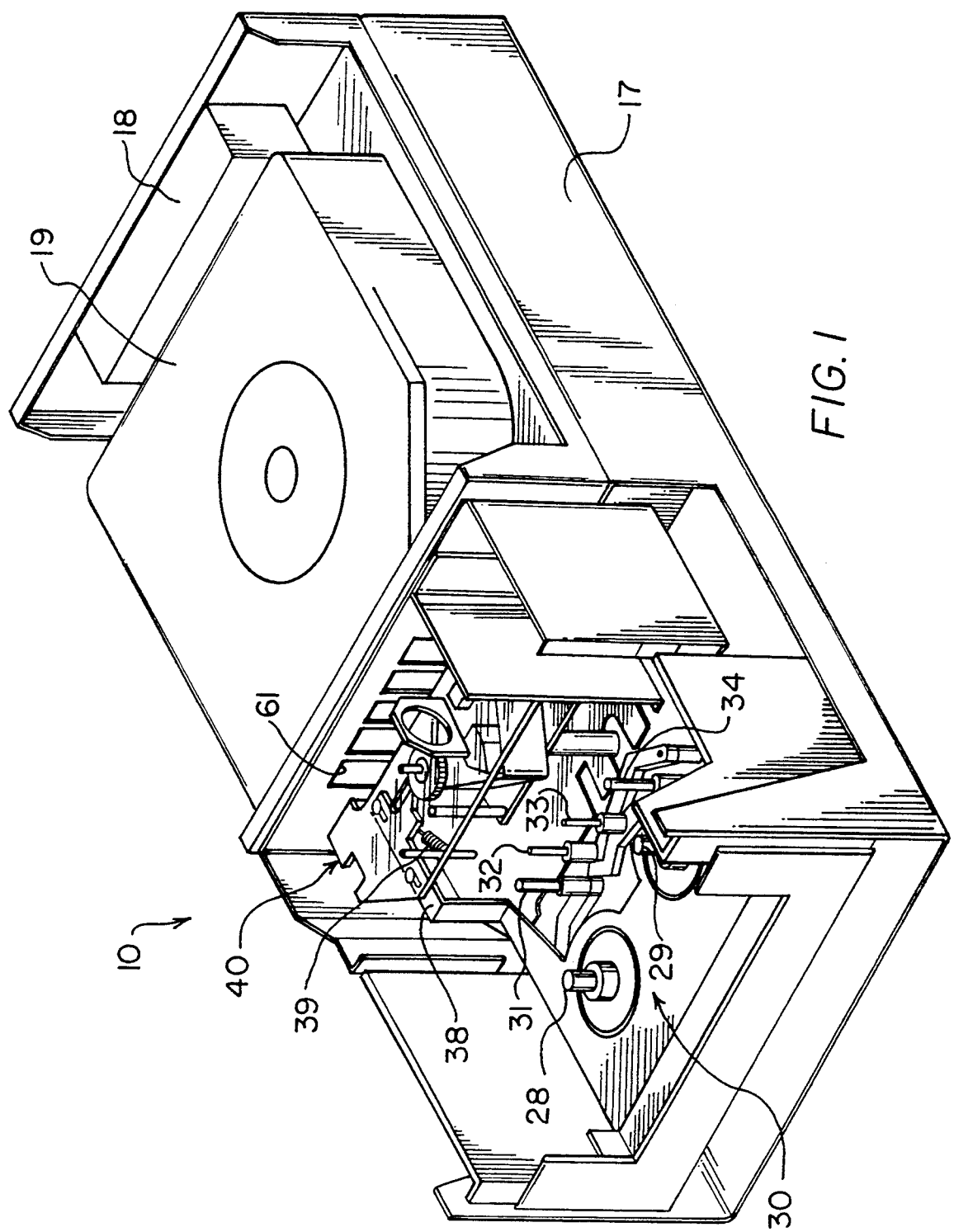
FIG. 1 is a partially sectioned, isometric view of a magnetic tape cleaning system in accordance with one embodiment of the present invention.
Figure 2:
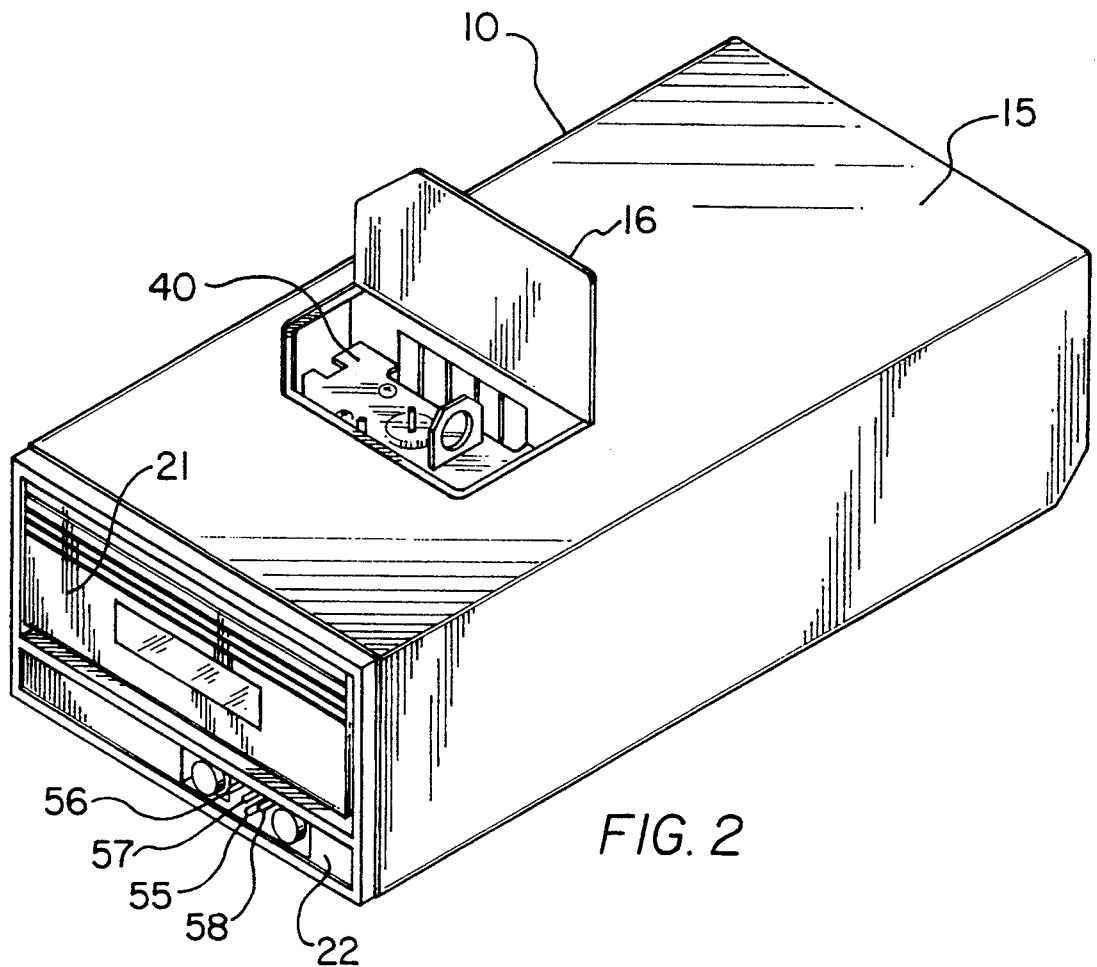
FIG. 2 is an isometric view of the magnetic tape cleaning system of FIG. 1 with the external cover and access doors in place.

FIG. 1 shows the preferred embodiment of the magnetic tape cleaning system 10 without the top cover 15 which is shown in FIG. 2. A tape cassette or cartridge 24 is inserted through the front door 21 (note FIG. 2) into a tape loading mechanism. The tape loading mechanism in removing the tape from the cartridge to position it at the cleaning station is conventional, and commercially available from contemporary sources.

The front loading mechanism loads tape 25 into a base deck assembly 30. As mentioned, base deck assembly 30 is conventional. For example, in the cleaning system shown here for eight millimeter tapes, the base deck assembly is a Sony BEVS, or equivalent, for handling tapes. For other tape sizes, such as four millimeter and quarter inch tape systems, other tape base decks are commercially available. After tape cartridge 24 is inserted into base deck assembly 30 and front door 21 is closed, unit 10 automatically fast forwards tape 25 to the end, then rewinds it to the beginning, under direction of the control circuitry (not shown). Tape cartridge 24 is then automatically ejected. The control circuitry and the drive motors are otherwise conventional.

Figure 7:
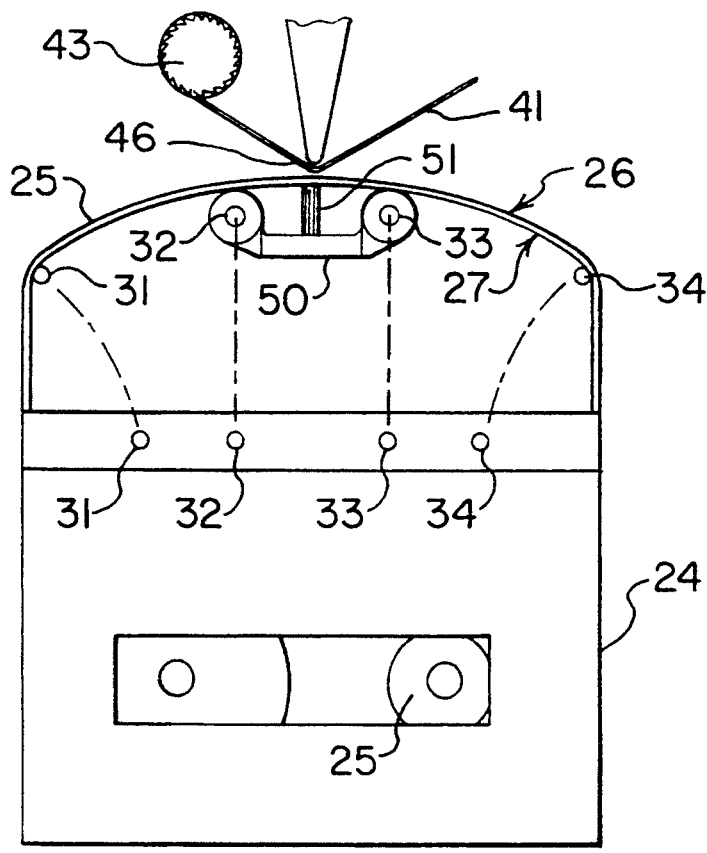
FIG. 7 is a top view of the elements associated with cleaning tape from a cartridge after it is loaded into a device in accordance with this invention.

While tape 25 is fast forwarded and rewound, it is subjected to cleaning operations on both sides, as seen in FIG. 7. That is, the front surface 26 of tape 25 is held in contact with cleaning material 41 by guides 31, 32, 33, and 34, which are part of the conventional base deck assembly in the preferred embodiment. This cleaning material 41 is automatically advanced, in the manner of a typewriter ribbon, every time the front door 21 of the unit 10 is closed. See the description of FIG. 3 for more detail.

Cleaning material 41 is a soft, non-scratching, chemically inert material, such as that used for cleaning photographic negatives in darkrooms, or of a type used as a liner in floppy disk Jackets, and commercially available from the International Paper Company. It is a non-woven, felt-like material that will not scratch or leave a residue. It loosens and rubs foreign matter off of the front surface 26 of tape 25 which, typically, is the side containing data. Meanwhile, a brush assembly 50 (shown in FIGS. 7 and 8) brushes particles off of the back side 27 of tape 25. Brush assembly 50 is a custom designed plastic part fitted onto guides 31 and 32, which move it forward in a parallel path to contact the tape. The brush is held against the back side 27 of tape 25 while tape 25 is in motion.

Figure 5:
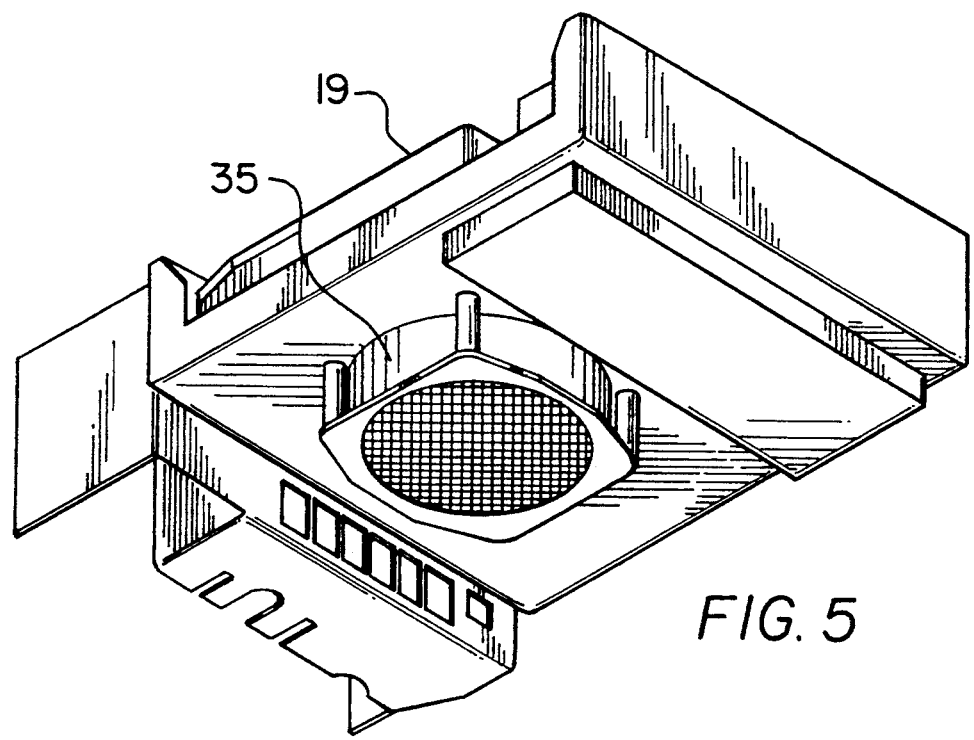
FIG. 5 is an isometric view of a lower portion of the recirculating air structure in the apparatus of FIG. 1 showing the electrostatic discharge (ESD) grid assembly.
Figure 6:
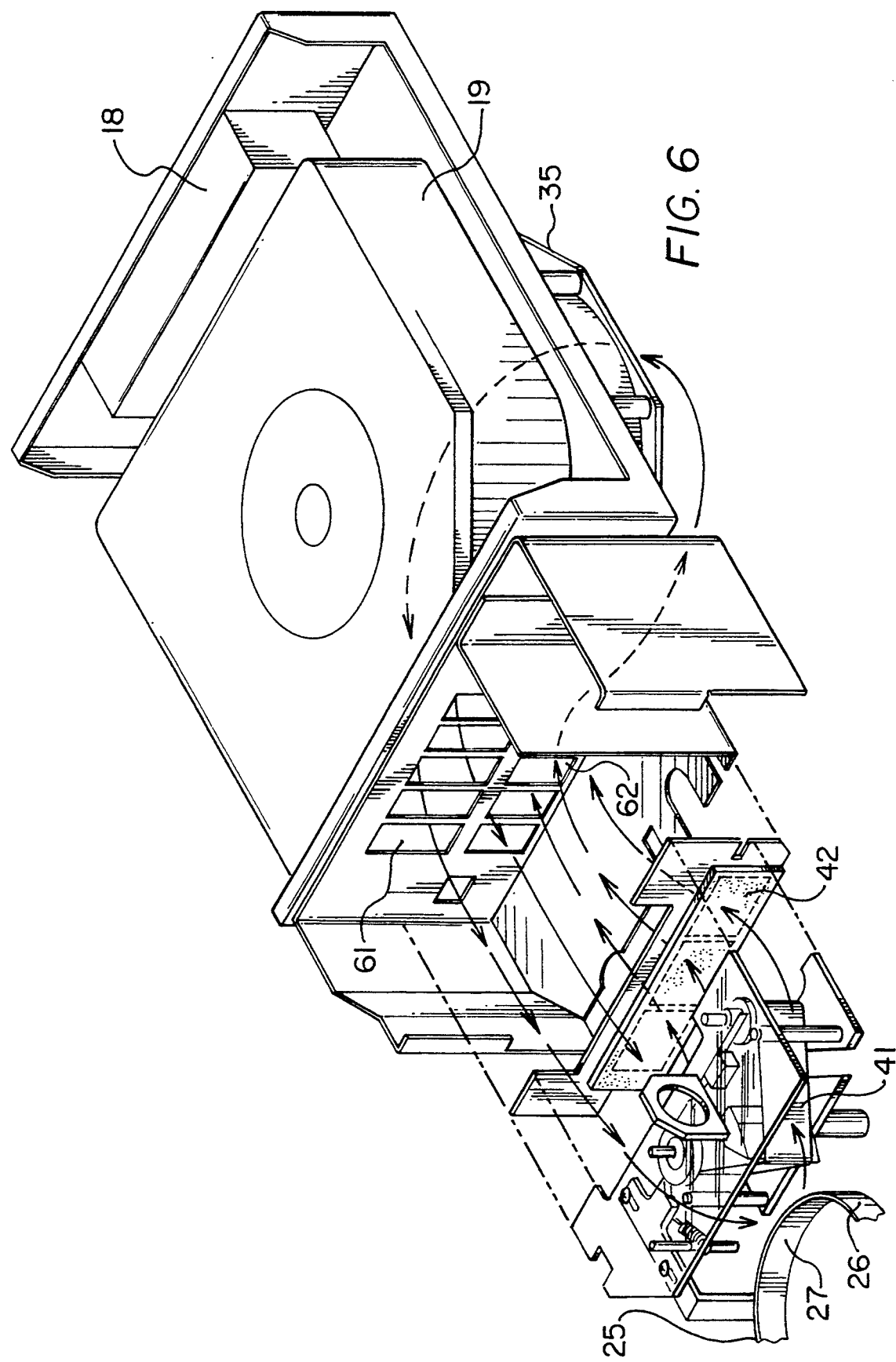
FIG. 6 is an isometric and partially exploded view of the ESD grid assembly, tape wiping, and air flow path defining elements of the invention.

This process is augmented by the FIGS. 5 and 6 structure wherein blower 19 drives air flow through ESD grid assembly 35 to ionize it, and sends it through an upper opening 61, across both surfaces 26 and 27 of tape 25, through filter 42 and back through lower opening 62. See the description of FIGS. 5 and 6 below for more detail on the aspects of the recirculating air flow path.

The air flow (typically 25 cubic feet per minute) sweeps particles away from tape 25, and towards filter 42. Since the air is negatively ionized, it also deionizes the particles so that they are no longer attracted to the magnetic tape 25.

FIG. 2 is an isometric view of the invention with top cover 15 in place. Access cover 16 opens to allow the user to remove and replace the cleaning unit 40. When the cleaning cartridge 40 is removed through access cover 16, an interlock (not shown) turns off the a.c. power to the main unit for safety purposes. Front cover 21 swings open from the top to allow tape insertion or removal.

Front panel 22 includes cleaning unit status indicators, as well as tape movement direction indicators. For instance, amber LED 55 signals the user when the cleaning material 41 is depleted. Green LEDs 56, 57, and 58 indicate the direction of the tape movement. If the tape is moving forward, the leftmost LED 56 lights and turns off first, followed by the center LED 57, and then by the rightmost LED 58. If the tape is reversing, the order of the LEDs also reverses. The cover 15 and the chassis 17 are preferably made of sheet metal.

Figure 3:
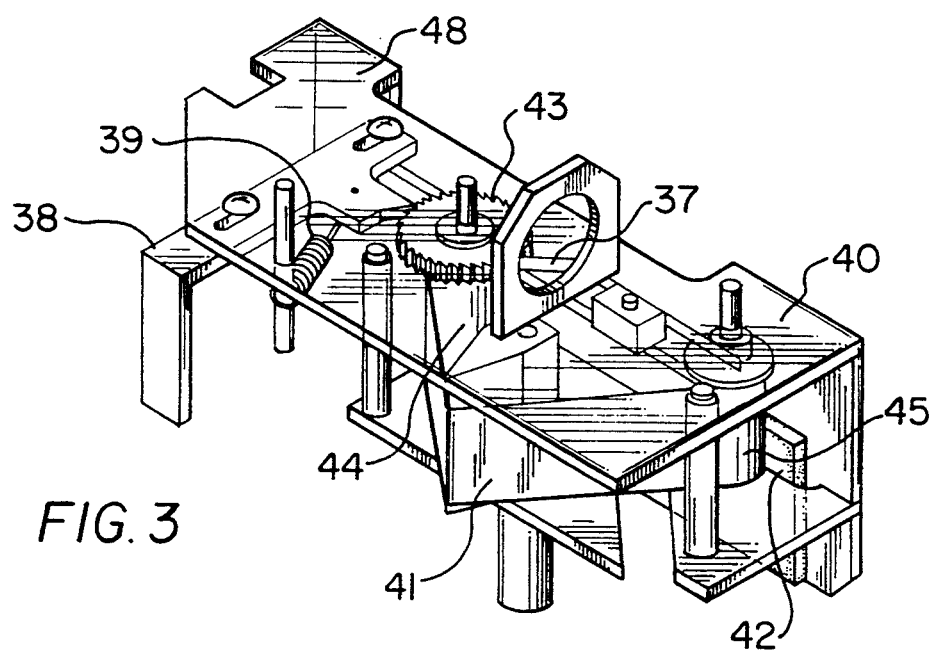
FIG. 3 is an isometric view of a tape cleaning cartridge removed from the FIG. 1 machine.
Figure 4:
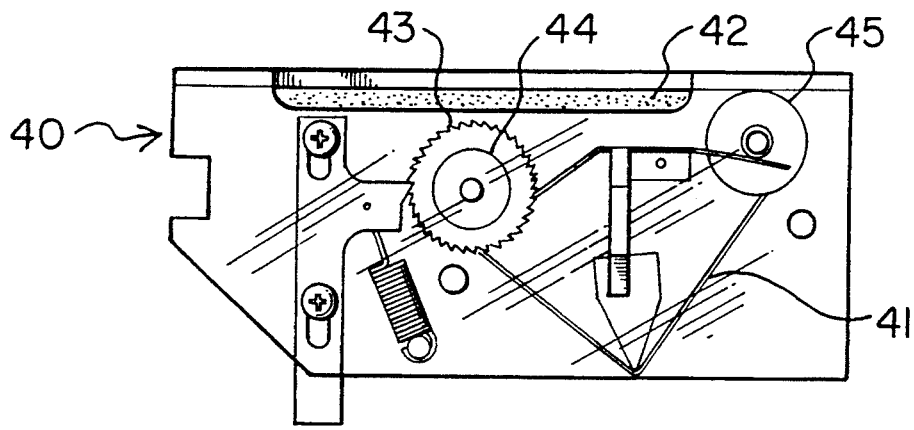
FIG. 4 is a top, plan view of the FIG. 3 tape cleaning cartridge.

FIGS. 3 and 4 show respective isometric and top views of the removable cleaning cartridge 40. Ratchet 43 is operated every time the front door 21 is closed. The operation of ratchet 43 winds the cleaning material from spool 45 onto spool 44. Thus, each time a tape 25 is inserted and the front door 21 is closed, a new, clean portion of the cleaning material 41 is presented. A tape leader sensor (not shown) turns on the amber LED on the front panel 22 when cleaning material 41 is used up. The user then removes the cleaning cartridge 40 through access cover 16, and puts a new one in. Filter 42 is made of a foam material called SIF "Z" Natural available from E. N. Murray Co., Inc., of Denver, Colo. It is $\frac{1}{8}$" thick, and has 100 pores per square inch.

FIG. 5 shows the ESD grid assembly 35 used to ionize the air flow. FIG. 6 shows the air flow through the unit 10. For example, blower 19 pulls 25 cubic feet per minute of air through ESD grid assembly 35, which is wired to have a potential of 2300 volts across its terminals. This voltage, as well as power to the whole unit, is provided by a custom designed, but conventional, power supply 18. The control circuitry is mounted in any suitable location within the housing of unit 10, such as the area around power supply 18. The now ionized air passes through upper opening 61, after which cooperation between upper plate 48 of cartridge 40 and the external housing enclosure of unit 10 directs the air against front surface 26 and back surface 27 of the tape 25. This deionizes any foreign particles on either surface of the tape 25, and pulls them away from the tape 25. The air flow thereafter passes through filter 42 in module 40 before returning to ESD grid assembly 35 and blower 19 through lower opening 62. The particles are filtered out of the air stream as it passes through filter 42.

FIG. 7, along with FIGS. 1 and 6, show the preferred embodiment in use. The user inserts a tape cartridge 24 through front door 21 of the unit 10. When the user closes front door 21, the front loading mechanism (not shown) pulls tape cartridge 24 into unit 10. Tape cartridge 24 is lowered onto spindles 28 and 29. Guides 31, 32, 33, and 34 extract tape 25 from cartridge 24, and move it forward so the front surface 26 contacts the front edge 46 of cleaning material 41. The dotted lines in FIG. 7 show the path of guides 31, 32, 33, and 34 in extracting tape 25 from cartridge 24, and transporting it into engagement with cleaner 41. Note that guide pins 32 and 33 also move brush assembly 50 into engagement with tape surface 27.

Brush assembly 50 (note FIG. 8) is fitted over guide pins 32 and 33, which move forward in a parallel path. Brush 51 contacts the back surface 27 of tape 25. When front door 21 is closed, the cartridge tray stop 38 is pushed backward (away from the front door 21) to operate ratchet 43 so that a new, clean portion of cleaning material 41 contacts tape 25. Spring 39 biases the cartridge tray stop 38 forward again when the opening of front door 21 allows it. Spring 39 also allows enough give in the movement of the cartridge tray stop 38 to allow it to move slightly sideways to clear ratchet 43 when cartridge tray stop 38 moves forward. Stop 37 prevents the ratchet from rotating backward.

Control circuitry mounted within the enclosure of unit 10 operates spindles 28 and 29 to fully fast forward tape 25, and then fully rewind it, so the surfaces 26 and 27 of tape 25 are cleaned twice. Then the control circuitry causes the front loading mechanism to eject tape cartridge 24. LEDs 56, 57, and 58 on front panel 22 indicate the direction of tape movement by blinking on and off in appropriate sequences.

While the tape 25 is fast forwarding and rewinding, negatively ionized air flows from upper opening 61, across both surfaces 26 and 27 of tape 25, through filter 42 and out through lower opening 62. As particles on tape 25 are loosened by brush 51 and cleaning material 41, the ionized air flow deionizes the particles and draws them away from the tape surface. Filter 42 removes the particles from the air flow.

Figure 8:
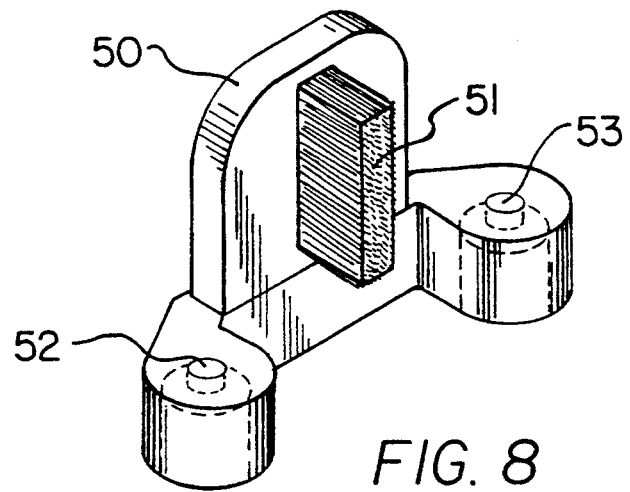
FIG. 8 is an isometric drawing of a brush assembly used in this invention.

FIG. 8 shows an isometric view of the brush assembly shown in FIG. 7, but omitted in the interests of clarity from FIG. 1. Brush 51 contacts the back surface 27 of tape 25. Holes 52 and 53 fit over guides 32 and 33, respectively.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. Apparatus for cleaning an elongated magnetic tape media having two surfaces, the tape media being intended for use in extremely high data density applications, comprising:
   means for moving the tape media along a predetermined path;
   means engaging one surface of the tape media with a wiping media at a first location;
   means for driving air through a flow path including said first location thereby passing air across both surfaces of the tape media;
   means for ionizing the air in said flow path prior to passage thereof over both surfaces of the tape media,
   said ionizing means including an electrostatic discharge grid in said flow path, and
   means for applying a potential voltage across said grid for ionizing the air in said flow path.

2. The apparatus of claim 1 wherein said wiping media comprises a soft felt-like material which contacts the front surface of the tape and said ionizing means negatively ionizes the air in said flow path.

3. The apparatus of claim 2 wherein said wiping media additionally includes brush means at said first location for engaging the surface of the tape opposite the surface engaged by said felt-like material.

4. The apparatus of claim 1 which further includes means periodically and incrementally moving the wiping media for providing a fresh surface for engaging the tape.

5. The apparatus of claim 1 which further includes means filtering the air passing through said flow path, and
   means forming said flow path in a closed loop thereby recirculating the air within said flow path.

6. High data density magnetic tape cleaning apparatus for use in cleaning magnetic tape having two surfaces, comprising:
   means for receiving a cartridge containing the tape,
   means for extracting the tape from the cartridge for presentation at a first station;
   first and second means for engaging both respective surfaces of the tape at said first station for dislodging particles therefrom;
   means providing a flow of air across both tape surfaces;
   means for ionizing the air from said flow providing means prior to engagement with both tape surfaces;
   said ionizing means including an electrostatic discharge grid in said flow of air, and
   means for applying a potential voltage across said grid for ionizing the air in said flow of air.

7. Apparatus in accordance with claim 6 wherein said first tape surface engaging means includes an elongated web of wiping material mounted to pass from a supply reel through said first station to a take-up reel; and
   means for periodically moving an increment of said elongated web from said supply reel to said take-up reel.

8. Apparatus in accordance with claim 7 which includes means mounting said first tape surface engaging means as a unit removable from said first station.

9. Apparatus in accordance with claim 7 wherein said second tape surface engaging means includes a brush, said cartridge receiving means including means moving said tape surface engaging means into spaced relation with one another when a tape cartridge is removed from said receiving means while causing said tape surface engaging means to press against the tape at said first location when a tape cartridge is introduced to said receiving means.

10. Apparatus in accordance with claim 9 wherein said first tape surface engaging means remains stationary while said brush is moved into and out of proximity with said first station.

11. A method for cleaning magnetic tape media with two surfaces comprising the steps of:
moving one surface of the tape media across a wiping material;
providing an air flow path;
providing an electrostatic grid in said air flow path,
providing a potential voltage across said grid for ionizing the air in said air flow path, and
causing said ionized air flow path to pass over both surfaces of the tape.

12. The method of claim 11 including the step of causing a brush to contact the surface of said tape opposite from one surface engaged by said wiping material.

13. The method of claim 11 which further includes the steps of filtering and recirculating said ionized air flow path.

14. The method of claim 11 which further includes the step of moving said wiping material periodically such that a new surface of said wiping material contacts said one surface of the tape each time it is brought into engagement with said wiping material.

* * * * *